United States Patent [19]

Ty

[11] Patent Number: 4,502,627
[45] Date of Patent: Mar. 5, 1985

[54] FLUID FLOW CONTROL APPARATUS

[75] Inventor: Henry Ty, Attleboro, Mass.

[73] Assignee: Texas Instruments Incorporated, Dallas, Tex.

[21] Appl. No.: 518,493

[22] Filed: Jul. 29, 1983

[51] Int. Cl.³ .............................................. G05D 23/08
[52] U.S. Cl. ................................ 236/93 R; 236/101 E
[58] Field of Search ................. 236/93 R, 101 E; 251/301, 303

[56] References Cited

U.S. PATENT DOCUMENTS

| | | | |
|---|---|---|---|
| 1,014,032 | 1/1912 | Atterbury | 236/101 E X |
| 1,449,675 | 3/1923 | Heiser | 236/93 R |
| 1,922,266 | 8/1933 | Toman | 236/93 R X |
| 2,805,660 | 9/1957 | Coleman, Jr. et al. | 236/101 E X |
| 3,089,648 | 5/1963 | Read | 236/93 R |
| 3,251,346 | 5/1966 | Merino | 236/101 E X |

FOREIGN PATENT DOCUMENTS 570125  12/1957  Italy .................................. 236/93 R Primary Examiner—William E. Tapolcai
Attorney, Agent, or Firm—John A. Haug; James P. McAndrews; Melvin Sharp

[57] ABSTRACT

A fluid flow control for an automotive automatic transmission system is shown in which a flag, attached to a free end of a thermostat element is caused to slide over a control orifice to provide a minimum fluid flow at a high reference temperature of the fluid and above and a maximum fluid flow at a low reference temperature of the fluid and below.

15 Claims, 5 Drawing Figures

FLUID FLOW CONTROL APPARATUS

BACKGROUND

This invention relates generally to valve apparatus for controlling fluid flow and more particularly to such apparatus for controlling the flow of hydraulic fluid in an automotive automatic transmission system.

A conventional transmission system includes two grooved plates positioned against opposite sides of a spacer member. The grooves in the plates match up and are interconnected by apertures in the spacer member to form a selected pattern of fluidic control passageways and chambers. When an automatic transmission is shifted, fluid flows in certain passageways to effect shifting of the transmission. Control orifices of specific size depending on the viscosity of the fluid and pressure to which it is subjected are employed to provide a smooth shifting function however it has been found that as the transmission fluid warms up and becomes less viscous, the fluid flow becomes excessive when shifting from park to first or from neutral to reverse. In order to compensate for this, it has been proposed to provide a temperature responsive valve such as one controlled by a thermostat metal element which would regulate the size of a control orifice between a maximum orifice diameter to assure adequate flow at a selected low temperature and a minimum orifice diameter at temperatures above the temperature at which further viscosity changes of the fluid are no longer significant. In one application a maximum diameter of 0.120 inch at 75° F. and a minimum diameter of 0.090 inch at 100° F. and above were selected. With adequate space a thermostat coil could provide sufficient movement to modulate the size of an orifice between these two limits however one of the constraints in providing a valve for a transmission system is the limited spaced available for placement of the valve, for example in the order of 10 mm $\times$ 10 mm $\times$ 10 mm. This constraint is exacerbated by the need to provide sufficient overtravel for the thermostat metal element so that it will not be limited in its movement by a stop which would induce undesirable stresses in the thermostat metal element thereby changing its calibration and reducing its useful life.

SUMMARY OF THE INVENTION

Accordingly, it is an object of the present invention to provide a temperature responsive valve for controlling fluid flow.

Another object of the invention is the provision of a valve having a thermostat metal element particularly suitable for placement in fluid control chambers of very limited size.

Yet another object of the invention is the provision of a valve having a thermostat metal element adapted to control the size of an orifice between a maximum diameter at a first low reference temperature and a minimum diameter at a second high reference temperature and above.

It is a still further object of the present invention to provide a fluid flow valve having a thermostat metal element adapted for use with widely varying temperatures which will have sufficient overtravel for the thermostat metal element to obviate the induction of undesirable stresses in the element.

Other objects and features of the invention will become more readily understood from the following detailed description and appended claims when read with the accompanying drawings in which like reference numerals designate like parts throughout the figures thereof.

Briefly, in accordance with the invention a valve assembly is provided having a base with a first orifice of the selected minimum area. A second orifice, in effect forming a parallel passageway, is provided in the form of an elongated slot which is oriented to lie along an arc of movement of a thermostat metal element or strip carrying a flag in the form of a plate which slides on the base so that very small angular movement of the element causes the flag to cross over the entire width of the slot shaped orifice making the necessary adjustment of effective orifice size as the temperature varies between the two reference points. This arrangement permits the use of a relatively short length of thermostat metal and allows a relatively large amount of overtravel in either direction for movement at temperatures above and below the reference temperatures. An alternative embodiment has a base plate configured so as to allow the first orifice to bypass the base and be formed solely in the spacer member.

DESCRIPTION OF THE PREFERRED EMBODIMENTS

Figure 1:
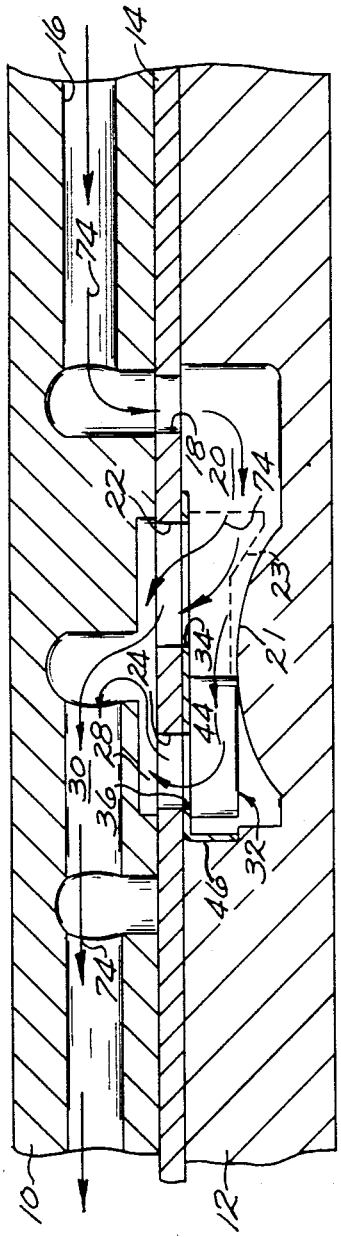
FIG. 1 is a cross section of a portion of an automotive automatic transmission system showing first and second grooved plates separated by a spacer member and having an interconnected chamber and passageways in which a valve assembly made in accordance with the invention is placed.

FIG. 1 shows first and second grooved plates 10, 12 respectively of a portion of an automotive automatic transmission system separated by a spacer member 14. Passageway 16 in plate 10 communicates with an aperture 18 in spacer member 14 and a chamber 20 in plate 12. First and second control orifices or apertures 22, 24 respectively, are formed in spacer member 14 and and lead to parallel passageways 26, 28 and in turn to common passageway 30 in plate 10.

A valve assembly 32 is placed in chamber 20 and is provided with a first control orifice or aperture 34 in alignment with aperture 22 in spacer member 14 and a second control orifice or aperture 36 in alignment with aperture 24 in spacer member 14.

Figure 2:
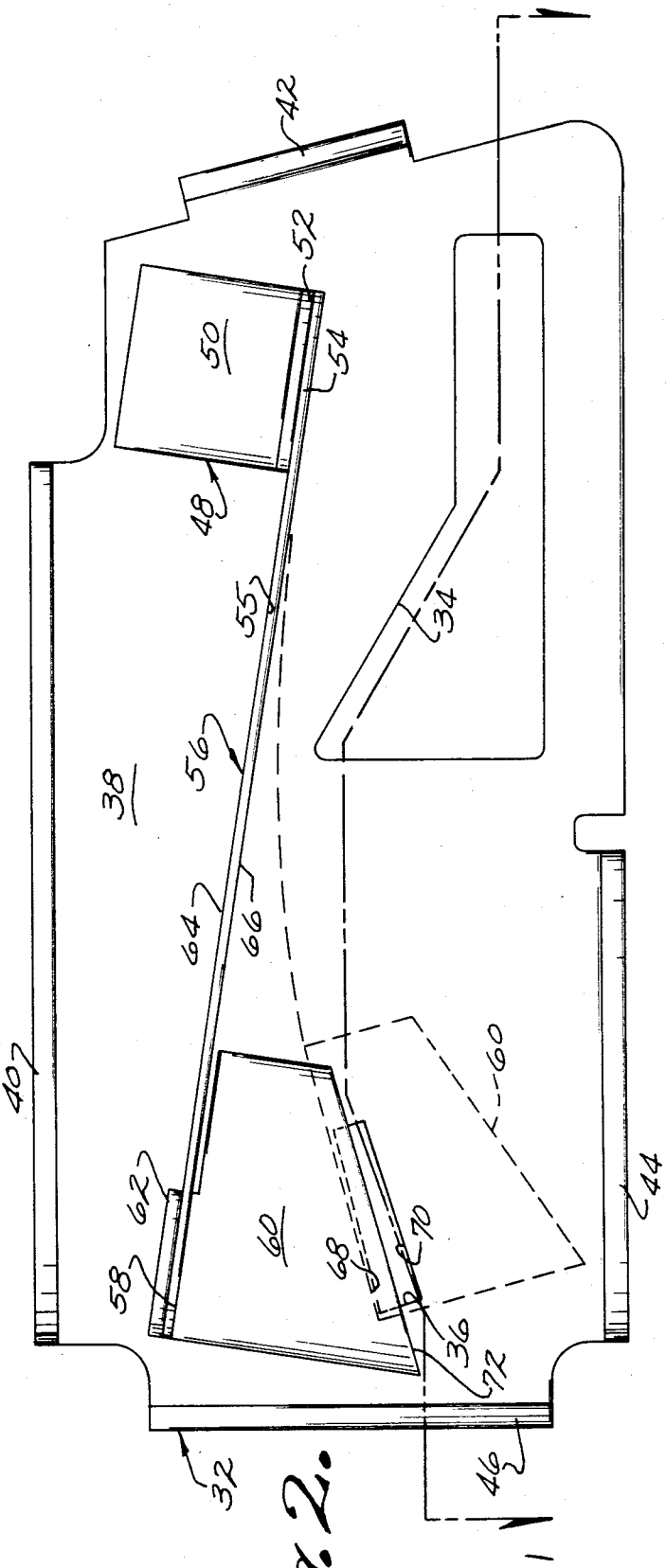
FIG. 2 is an enlarged bottom plan view of the valve assembly shown in FIG. 1.

As seen in FIG. 2, valve assembly 32 comprises a base plate 38 of any suitable material such as a stainless steel and is shown with upstanding legs 40, 42, 44 and 46 which are provided to facilitate handling of the valve assembly as well as to provide a degree of protection to prevent damage to the valve element while being handled.

First control orifice 34 is configured to provide the desired minimum area, selected for the high reference temperature. Second control orifice 36 is configured to provide additional orifice area up to the maximum selected for the low reference temperature. A generally L-shaped bracket 48 of any suitable material such as stainless steel has a first leg 50 attached to base 38 in a conventional manner, as by welding, and a second leg 52 extending vertically upwardly from base 38. A first end 54 of an elongated thermostat metal element or strip 56, generally flat in the direction of its length is attached to leg 52 in a conventional manner, as by welding. A valve closure member or flag 60 is a generally flat plate adapted to slide on the surface of base 38 and is provided with an upstanding leg 62 which is attached to the second or distal free end 58 of thermostat metal element 56.

Thermostat metal element 56, as is well known in the art, is formed of metal layers having different coefficients of expansion bonded together so that as the temperature of the element varies, the element will flex or bend a given amount based on the particular metals chosen. In the instant case a suitable element having a high degree of flexivity can be formed from material having a high expansion side comprising an alloy of 72% manganese, 18% copper and 10% nickel and a low expansion side comprising 36% nickel and 64% iron.

Thermostat metal element 56 has opposite major face surfaces 64, 66 respectively which are vertically disposed relative to the major surface of base plate 38 so that as the temperature of element 56 varies the free distal end 58 will swing in an arc and will carry flag 60 along with it to cause flag 60 to slide over the top surface of base plate 38.

In order to best fit into the allowed space in chamber 20, the width of element 56 (or as mounted in FIG. 1, the height,) may be tapered down from the bracket 50 to point 55 and continue on uniformly to end 58 in order to allow clearance for a bulge 21 formed in chamber 20. See dashed line 23 in FIG. 1 which represents the configuration of a portion of element 56 which is not seen since it is behind the section line 1—1 of FIG. 2.

Second control orifice 36 is configured as an elongated slot generally trapezoidal in shape with non-parallel edges 68 and 70 so arranged that straight edge 72 of flag 60 is generally parallel with respective edges 68 and 70 as end 58 of the thermostat element moves edge 72 in its arc into alignment therewith. As seen in FIG. 2, orifice 36 is approximately half open with flag 60 shown in the solid line position. As the temperature of thermostat element 56 gets lower, end 58 will swing upwardly to fully expose orifice 36. As the temperature of thermostat element 56 gets higher, end 58 will swing downwardly with edge 72 moving into alignment with edge 70 at the high reference temperature to fully close orifice 36. The dashed line position is representative of the position of thermostat element 56 and flag 60 at 300° F. which is high enough for any expected environment to which the assembly will be subjected. The surface area and configuration of flag 60 is selected so that orifice 36 will remain closed at temperatures above the high reference temperature. The size of the control orifice need not be further diminished at temperatures above the high reference temperature since changes in the viscosity of the transmission fluid are no longer significant at those temperatures. It will be seen that the above arrangement allows ample overtravel both above and below the referenced temperatures.

Assembly 32 may be conveniently attached to spacer member 14 which is conventionally formed of a low carbon steel, by welding base plate 38 directly thereto.

With reference to FIG. 1 arrows 74 represent the flow of transmission fluid from passageway 16 into chamber 20. At temperatures below the low reference temperature, e.g., 75°, both orifices 34, 36 will be fully open with the fluid flowing in parallel passageways 26, 28 and on through passageway 30. As the temperature of the transmission fluid increases, and hence the thermostat element 56 which is inundated in the fluid, the thermostat element will move across orifice 36 to modulate the flow of the fluid into passageway 28 based on the temperature. It will be seen that little total arc movement of thermostat element end 58 is required to completely close orifice 36. When closed fluid is still able to flow through orifice 34 into passageway 30.

Figure 3:
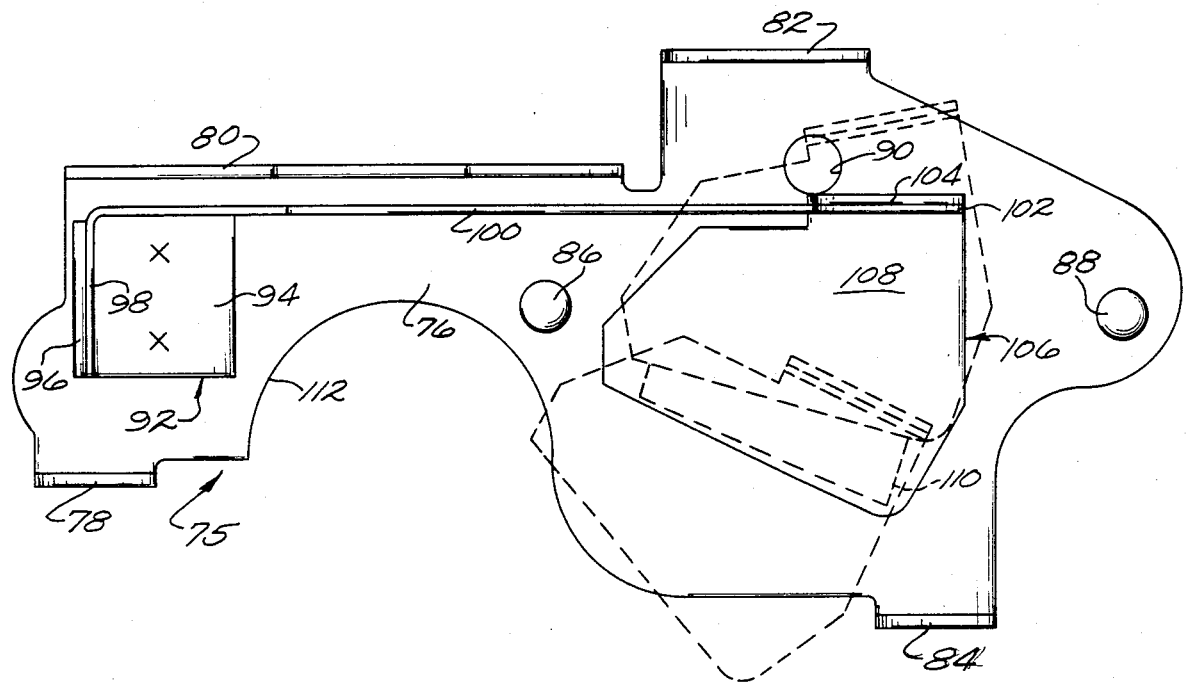
FIG. 3 is an enlarged bottom plan view similar to FIG. 2 of an alternative embodiment of a valve assembly.
Figure 4:
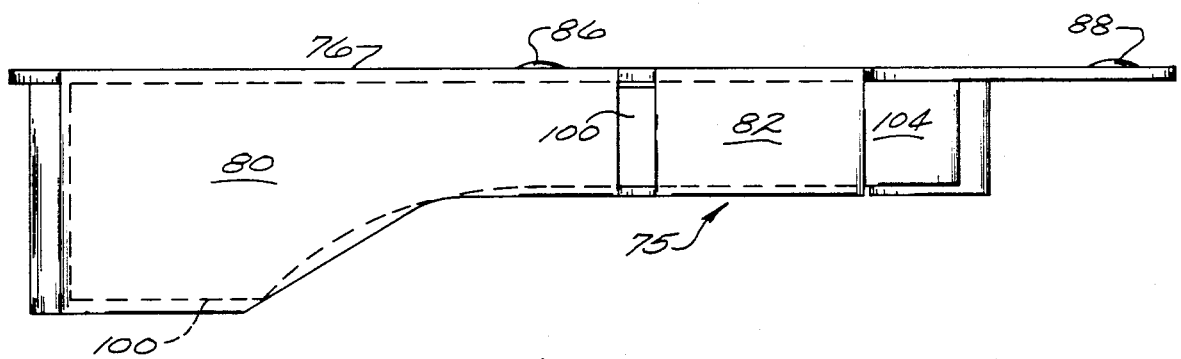
FIG. 4 is an enlarged front view of the FIG. 3 embodiment.
Figure 5:
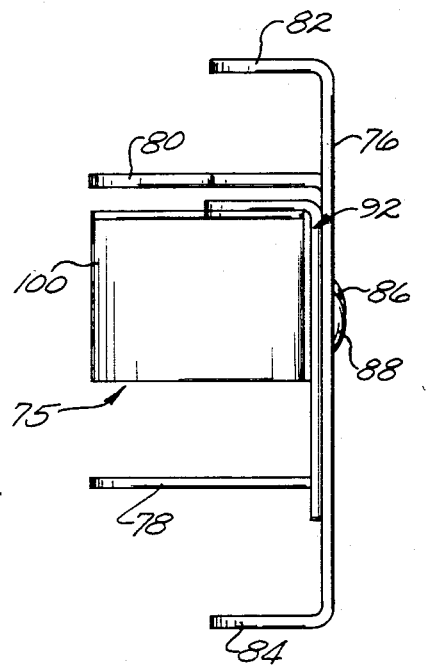
FIG. 5 is an enlarged side view of the FIG. 3 embodiment.

With reference to FIGS. 3-5 a second embodiment 75 is shown comprising a base plate 76 which can be formed of the same material as in the first embodiment. Base plate 76 has a flat surface from which upwardly extend legs 78, 80, 82 and 84 to facilitate handling and provide protection in the same manner as legs 40-46 of assembly 32. Weld projections 86, 88 are preferably provided in base plate 76 to facilitate attachment to the spacer member and, if desired, a pilot hole 90 can be formed in the base plate for manufacturing and assembly purposes. The pilot hole, when the assembly is mounted, is closed by the spacer member.

An L-shaped bracket 92 of suitable material such as stainless steel has a first leg 94 secured to base plate 76 as by welding and a second, generally vertically upstanding leg 96 to which is secured a first end 98 of thermostat metal element or strip 100, similar to thermostat element 56. Element 100 has a second free distal end 102 to which is attached an upstanding leg 104 of flag 106 in a conventional manner as by welding thereto. Flag 106 has a flat surface 108 adapted to slide on the surface of base plate 76 under the influence of thermostat metal element 100 in the same manner as flag 60 of assembly 32. A control orifice 110, in the form of an elongated slot generally trapezoidal in configuration cooperates with flag 106 in the same manner as in the first embodiment however base plate 76 has a cut away portion 112 to allow placement of the minimum size control orifice directly in the spacer member without going through base plate 76.

Flag 106 is shown completely covering control orifice 110 which is the position of flag 106 at a temperature slightly higher than the high reference temperature. The flag is also shown in dashed lines to represent overtravel positions both below the low reference temperature and above the high reference temperature.

By means of the present invention a very simple yet reliable control is provided which employs a short, inexpensive thermostat strip in such a manner that very little angular movement of the element is required, in the order of 10°, to obtain the desired modulation between a minimum control orifice at a high reference temperature and above and a maximum control orifice at a low reference temperature and below with provision of overtravel to prevent the inducement of undesirable stresses. It will be understood that the specific configuration of the slot and the shape of the leading edge of the flag can be varied as long as the effect of the elongated slot is utilized to obtain the benefit of the control of a relatively large area with little angular movement.

Although the invention has been described with respect to specific preferred embodiments thereof, many variations and modifications will become apparent to those skilled in the art. It is the intent that the appended claims be interpreted as broadly as possible in view of the prior art to include all such variations and modifications.

I claim:

1. A fluid flow control comprising a body having a valve chamber and having a fluid passageway leading to and from the valve chamber, a base plate disposed in the valve chamber and adapted to separate the chamber into two portions with the fluid passageway leading to one of the portions and leading from the other of the portions, a first control orifice formed in the base plate permitting fluid flow through the passageway, a second control orifice formed in the base plate to permit additional fluid flow through the passageway, the second orifice being in the form of an elongated slot having a length and a width with the length substantially greater than the width, the slot having first and second edges extending generally in the direction of the length, a flag disposed on the base plate and adapted to slide over the second orifice, a thermostat element having two ends, one end mounted on the base plate, the other end mounting the flag, the other end of the thermostat element movable in an arc as the temperature of the thermostatic element changes, the flag having an edge movable into alignment with the first edge of the slot at a first selected temperature with the second orifice fully covered by the flag and the second edge of the slot at a second selected temperature with the second orifice fully uncovered by the flag so that the flag will slide over the surface of base plate defining the second orifice as the temperature changes thereby controlling relatively large orifice area with little angular movement of the thermostat element.

2. A fluid flow control according to claim 1 in which the flag is provided with a generally straight edge portion and the slot has a general configuration of a trapezoid with the first and second edges being the two nonparallel edges which extend in directions which are parallel to the edge portion of the flag as the second end of the thermostat element causes the edge portion of the flag to move into alignment with the respective nonparallel edges of the slot.

3. A fluid flow control comprising a body having a valve chamber and having a fluid passageway leading to and from the valve chamber, a base plate disposed in the valve chamber and adapted to separate the chamber into two portions with the fluid passageway leading to one of the portions and leading from the other of the portions, an elongated slot shaped orifice formed in the base plate to permit fluid flow through the passageway, the orifice having a length and a width with the length substantially greater than the width, the orifice having first and second edges extending generally in the direction of the length, a flag disposed on the base plate and adapted to slide over the orifice, a thermostat element having two ends, one end mounted on the base plate, the other end mounting the flag, the other end of the thermostat element movable in an arc as the temperature of the thermostat element changes, the flag having an edge movable into alignment with the first edge of the orifice at a first selected temperature with the orifice fully covered by the flag and the second edge of the orifice at a second selected temperature with the orifice fully uncovered by the flag so that the flag will slide over the surface of the base plate defining the orifice as the temperature changes thereby controlling a large orifice area with relatively little angular movement of the thermostat element.

4. A fluid flow control according to claim 3 in which the tab is provided with a generally straight edge portion and the elongated slot shaped orifice has the general configuration of a trapezoid with the first and second edges being the two nonparallel edges which extend in directions which are parallel to the edge portion of the tab as the second end of the thermostat element causes the edge portion of the flag to move into alignment with the respective nonparallel edges of the slot.

5. A fluid flow valve device comprising a base plate adapted to separate two portions of a valve chamber from one another, a bracket mounted on a face surface of the base plate, the bracket having a leg upstanding from the surface, an elongated thermostat strip element being generally flat in the direction of its length having a first end attached to the upstanding leg and a free distal second end, the strip element having two opposed major face surfaces, the strip element attached to the leg such that the face surfaces of the element lie in a plane generally perpendicular to the face surface of the base plate, a flag having a major face surface disposed on the face surface of the base plate, the flag mounted on the free distal second end of the strip element and adapted to slide along the face surface of the base plate as the strip element bends concomitantly with changes in temperature, and an orifice formed the base plate, the orifice being in the form of an elongated slot having a length and a width with the length substantially greater than the width, the slot having first and second edges extending generally in the direction of the length, the flag having an edge movable into alignment with the first edge of the slot at a first selected temperature with the orifice fully covered by the flag and the second edge of the slot at a second selected temperature with the orifice fully uncovered by the flag.

6. A fluid flow valve device according to claim 5 in which the flag is provided with a generally straight edge portion and the slot has two nonparallel edges which extend in directions which are parallel to the edge portion of the flag as the second end of the strip element causes the edge portion of the flag to move into alignment with the respective nonparallel edges of the slot.

7. A fluid flow valve device according to claim 6 including means to provide overtravel of the flag at temperatures of the strip element lower and higher than the respective first and second selected temperatures.

8. A fluid flow control according to claim 2 including means to provide overtravel of the flag at temperatures of the thermostat element lower and higher than the respective first and second selected temperature.

9. A fluid flow control according to claim 4 including means to provide overtravel of the flag at temperatures of the thermostatic element lower and higher than the respective first and second selected temperatures.

10. A fluid flow control comprising an automotive automatic transmission system body having a valve chamber and having a fluid passageway leading to the chamber and first and second parallel passageways leading from the chamber, means to modulate the fluid flow through one of the first and second parallel passageways comprising a base plate having an orifice permitting fluid flow therethrough, the orifice being in the form of an elongated slot having a length and a width with the length substantially greater than the width, the slot having first and second edges extending generally in the direction of the length, a flag disposed on the base plate and adapted to slide over the orifice, a thermostat element having two ends, one end mounted on the base plate, the other end mounting the flag, the other end of the the thermostat element movable in an arc as the temperature of the thermostat element changes, the flag having an edge movable into alignment with the first edge of the slot at a first selected temperature with the orifice fully covered by the flag and the second edge of the slot at second selected temperature with the orifice fully uncovered by the flag so that the flag will slide over the surface of base plate defining the orifice as the temperature changes thereby controlling a large orifice area with relatively little angular movement of the thermostat element.

11. A fluid flow control comprising a base plate having an orifice permitting fluid flow therethrough, the orifice being in the form of an elongated slot having a length and a width with the length substantially greater than the width, the slot having first and second edges extending generally in the direction of the length, a flag disposed on the base plate and adapted to slide over the orifice, a thermostat element having two ends, one end mounted on the base plate, the other end mounting the flag, the other end of the thermostat element movable in an arc as the temperature of the thermostat element changes, the flag having an edge movable into alignment with the first edge of the slot at a first selected temperature with the orifice fully covered by the flag and the second edge of the slot at a second selected temperature with the orifice fully uncovered by the flag so that the flag will side over the surface of the base plate defining the orifice as the temperature changes thereby controlling a relatively large orifice area with little angular movement of the thermostat element.

12. A fluid flow control according to claim 11 in which the slot is in the general configuration of a trapezoid with the first and second edges being nonparallel to one another.

13. A fluid flow control according to claim 11 including means to provide overtravel of the flag at temperatures of the thermostat element lower and higher than the respective first and second selected temperatures.

14. A fluid flow control according to claim 11 in which the base plate has a major surface in which the orifice is formed and the thermostat element has first and second major faces vertically disposed relative to the major surface of the base plate.

15. A fluid flow control according to claim 14 including a bracket mounted on the base plate, the bracket having an upstanding leg, the said one end of the thermostat element being fixed to the upstanding leg.

* * * * *